United States Patent [19]

Tafara

[11] Patent Number: 4,545,833

[45] Date of Patent: Oct. 8, 1985

[54] METHOD OF MAKING A FILTER BAG ASSEMBLY

[76] Inventor: Peter T. Tafara, 4803 Spring St., Neptune, N.J. 07753

[21] Appl. No.: 587,454

[22] Filed: Mar. 8, 1984

[51] Int. Cl.[4] .......................... B32B 31/16; B32B 7/08
[52] U.S. Cl. .................................. 156/93; 112/262.2; 112/441; 156/218; 156/308.4; 210/348; 210/471; 210/497.01
[58] Field of Search .................. 112/262.1, 262.2, 422, 112/440, 441; 156/93, 218, 308.4; 210/348, 465, 470, 471, 497.01

[56] References Cited

U.S. PATENT DOCUMENTS 3,544,404 12/1970 Johnson et al. ............... 156/308.4 X
4,052,319 10/1977 Friedman ............................ 210/465
4,274,896 6/1981 Bosse ............................ 156/308.4 X
4,390,425 6/1983 Tafara et al. ...................... 210/232
4,490,253 12/1984 Tafara ............................... 210/470 X

*Primary Examiner*—Robert A. Dawson
*Attorney, Agent, or Firm*—Sachs & Sachs

[57] ABSTRACT

A filter bag assembly includes a filter media fabricated from synthetic materials, has a heat sealed edge forming a cylinder, with one end of the cylinder being heat sealed (welded) to form a closed container. The other cylinder end is folded over a relatively rigid ring member and is sewn (stitched) in a manner to affix the ring member to the filter media thereby maintaining the integrity of the media's micron rating.

10 Claims, 6 Drawing Figures

METHOD OF MAKING A FILTER BAG ASSEMBLY

BACKGROUND OF THE INVENTION

1. Field of the Invention

The present invention relates to filter assemblies, and in particular, to a filter bag which is capable of maintaining the micron integrity of the filter media used when used in a pressurized filter system.

2. Discussion of the Relevant Art

In pressurized filter systems wherein filter bag assemblies are utilized, generally, a solid filter basket is used to support the filter bag since the filter media is unable to withstand the pressures under which the system operates.

A typical pressurized filter system is disclosed in U.S. Pat. No. 4,390,425 issued on June 28, 1983 to Peter T. Tafara. This type of construction is satisfactory for most applications. The rigid filter basket is provided with a plurality of holes therein and adequately supports the filter bag assembly while under pressure. Accumulation of residue occurs within the bag and when the bag is filled (reducing the fluid flow therethrough) the filter bag assembly is removed from the filter basket and replaced.

In many applications, in use today, the integrity of the filter media becomes critical in order to filter out minute particles from the fluid being filtered. The filter media must be capable of removing particles having micron ratings from 1 to 100 and, in addition, remove free and entrained, emulsified oil and grease within the fluid, which is being filtered under pressure. The filter assembly, which includes media manufactured of various types of material such as polyesters, fiberglass, etc., generally have micron ratings suitable for proper filtration. However, in the manufacture of the filter bag it has always been a problem to provide a seamed surface that does not have holes in it greater than the micron rating of the media. Conventionally, the filter bag assembly has been formed utilizing a sewing technique wherein the holes formed by the piercing sewing needle destroys the integrity of the filter media and a small amount of leakage through the needle holes allows particles to enter the downward stream of the filter bag assembly. In critical applications the needle holes destroy the usefulness of the filter. Many techniques of overlap, rollover, foldover, etc., have been attempted to overcome this problem, however, Applicant is not aware of any successful techniques heretofore.

Therefore, it is an object of the present invention to provide a filter bag assembly that maintains the integrity of the filter media utilized.

It is a further object of the present invention to provide a filter bag assembly that is inexpensive to manufacture and provides filtering capabilities under pressure to the limits of the media chosen.

It is a further object of the present invention to provide a filter bag assembly suitable for the use within pressurized filter housings.

It is still yet another object of the present invention to provide a method of manufacturing a filter bag assembly wherein the integrity of the media utilized is maintained.

SUMMARY OF THE INVENTION

A filter bag assembly, according to the principles of the present invention, comprises in combination; a ring member device of relatively rigid material, filter media generally elongated in shape and folded upon itself in the longitudinal direction. The longitudinal edges are heat sealed (welded) forming a cylinder with one end of the cylinder also heat sealed (welded) to form a closed container. The other cylinder end is folded over the ring member and is sewn in a manner to affix the ring member to the filter media.

A method, according to the principles of the present invention, for fabricating a filter bag assembly comprises the steps of: preparing filter media in an elongated, generally rectangular configuration, folding the media in half along its longitudinal axis, placing the juxtaposed edges of the media over a resistance wire disposed in a heated bar, closing the pressure bar upon the heater bar with the media disposed therebetween with a prescribed amount of pressure, applying electrical current to the resistance wire for a prescribed period of time, opening the pressure bar after termination of the electrical current and a prescribed low temperature limit is reached, removing the media from the heater bar, inserting one distal end of the media between the pressure bar and the heater bar with a prescribed amount of pressure, applying electrical current to the resistance wire for a period of time, opening the pressure bar after termination of the electrical current and the prescribed low temperature limit is reached, placing the open distal end of the media over a relatively rigid ring, and sewing the media so as to capture the ring and form a container.

The foregoing and other objects and advantages will appear from the description to follow. In the description reference is made to the accompanying drawing which forms a part hereof, and in which is shown by way of illustration a specific embodiment in which the invention may be practiced. This embodiment will be described in sufficient detail to enable those skilled in the art to practice the invention and it is to be understood that other embodiments may be utilized and that structural changes may be made without departing from the scope of the invention. The following detailed description is, therefore, not be taken in the limiting sense, and the scope of the present invention is best defined by the appended claims.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENT

Figure 1:
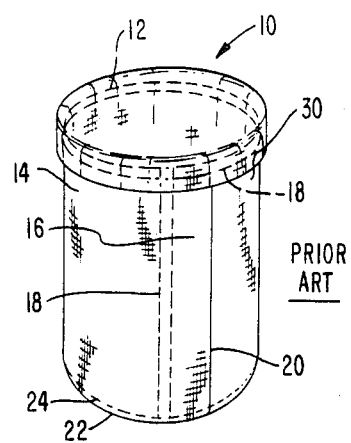
FIG. 1 is a pictorial representation of a filter bag assembly fabricated in accordance with the prior art.

Referring now to the figures, and in particular, to FIG. 1, there is shown a filter bag assembly 10 which includes a ring member 12 and a filter bag 14 fabricated from any number of filter materials commonly referred to as the filter media. The bag is generally fabricated by cutting the filter media 14 in a generally rectangular shape, similar to that shown in FIG. 4, and then folded upon itself with a flap 16 whereupon a plurality of stitches 18 are sewn parallel to the longitudinal axis, not shown, which runs generally parallel to the edge 20 of the media of the filter bag 14. The bottom edge 22 is then stitched closed, in a conventional manner, by placing stitches 24 proximate the edge 22 thereby forming a filter bag.

Figure 2:
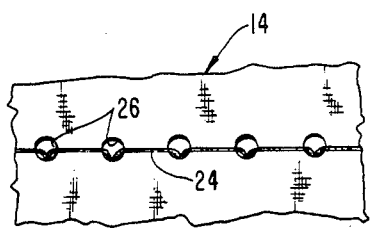
FIG. 2 is an enlarged section of the filter bag shown in FIG. 1, showing the holes formed by performing a stitching operation.

Referring now to FIG. 2, which has an enlarged partial view of the stitching area, it can be readily seen that the needle which applies the thread forming the stitches 24 into the filter media cause a plurality of holes 26 to occur in the media. The size of the hole 26 is directly related to the size of the needle used to apply the stitches 24 and 18 during the sewing operation. In order to provide the necessary strength to the seams a relatively large diameter thread is utilized thereby requiring a needle having a thickness which generally is greater than the filtering capabilities of the media used to fabricate filter bag 14. Thus, although many different types of configurations and overlaps have been used over the years, leakage still occurs through the holes caused by the needle passing through the media.

The filter bag 14 is generally placed within ring 12 and the flap portion 28 is draped over the outer circumference of ring number 12 and sewn into position, in a conventional manner, by means of stitching 30 where, here again, the needle holes are generally greater than the filtering capabilities of the media utilized to fabricate the filter bag.

Figure 3:
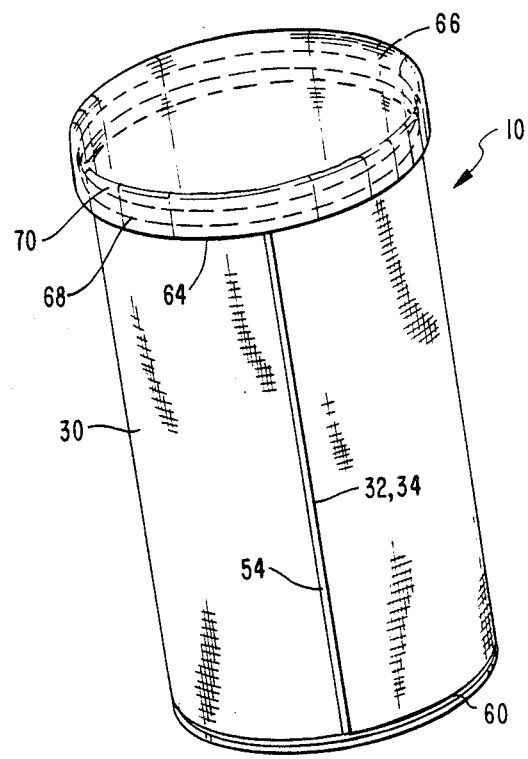
FIG. 3 is an isometric view of a filter bag assembly fabricated, according to the principles of the present invention.
Figures 4, 5:
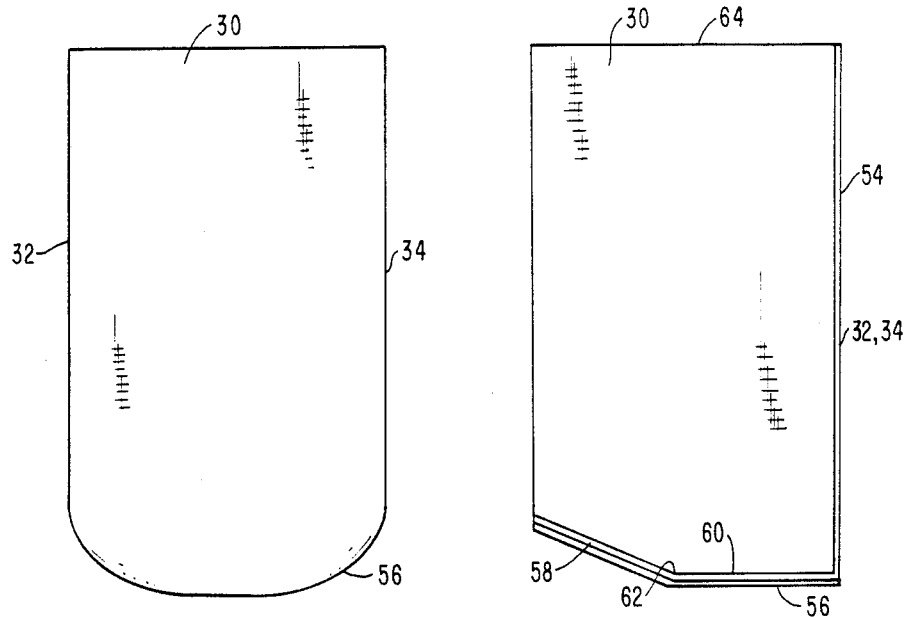
FIG. 4 is a plan view of the media shape prior to being welded in the manner disclosed in the instant invention.
FIG. 5 is a plan view of the filter media after having been heat welded.

Referring now to FIGS. 3, 4 and 5, which utilizes a fabrication technique devoid of needle holes in the portion of the bag where the filtering is accomplished.

Figure 6:
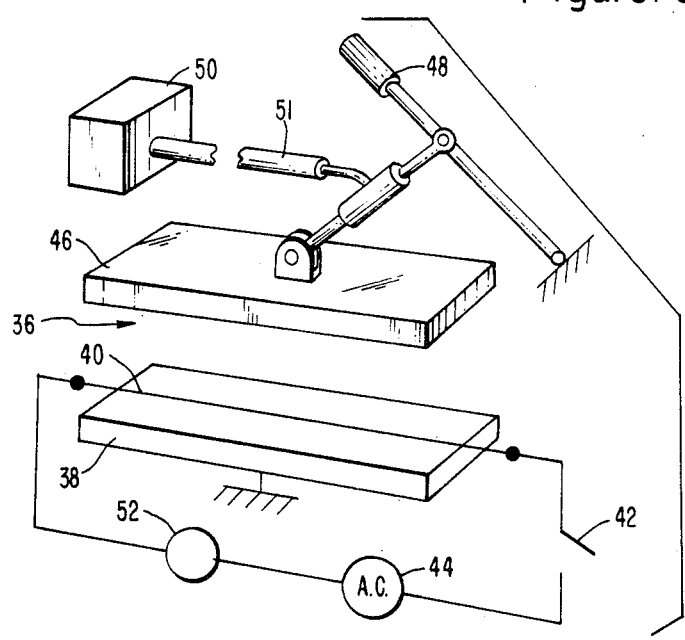
FIG. 6 is a pictorial representation of the apparatus required to perform the heat sealing (welding) disclosed in the instant invention.

FIG. 4 discloses the generally elongated shape of the media 30 that has been cut in order to form the filter bag assembly 10 to be fabricated, according to the principles of the instant invention. The media 30 may be selected from the generic classes of synthetic fibers and may be fabricated from either non-woven or woven material of polypropylene, polyester, fiberglass, fluorocarbon or polyamide. These materials are known by trademarks such as Nomex and Teflon. Once the media is cut to the general shape shown in FIG. 4 it is then folded upon itself (one half) until the edges 32 and 34 are juxtaposed. The media is then placed upon a pressure bar apparatus 36 as shown in FIG. 6.

The pressure bar apparatus includes a heater bar 38 into which is embedded, proximate the surface thereof, a resistance (heater) wire 40. The resistance wire 40 is connected, via an on-off switch 42 to a source of voltage 44 capable of providing the necessary current to raise the resistance wire to the proper temperature (in excess of the melting point of the media utilized). Preferably, AC power is utilized although a DC power source could be used as well.

The edges 32 and 34 of the media 30 are placed upon the heater bar with the resistance wire 40 being parallel to the edges 32 and 34, with the edges extending slightly over the heater wire 40. The pressure bar 46 is placed upon the media 30 and sandwiched between the heater bar 38 and pressure bar 46 by pulling down on handle 48. The required pressure to perform the heat weld is obtained from a pressurized fluid source 50, preferably of compressed air, which is connected via, a hose 51, to the pressure source 50, thereby maintaining an accurate pressure upon pressure bar 46. An automatic timer 52 may be utilized to control the time that the current is applied to the resistance wire, thereby achieving the proper operating temperature. Alternatively, a temperature measuring device, not shown, may be coupled to resistance wire 40 in order to accurately determine the temperature of the resistance wire during welding process.

Once the proper time and temperature have been achieved a weld 54 will be formed along the longitudinal edge of the media 30 with the excess being severed by resistance wire 40, thereby forming a cylinder. One end 56 may be placed on the pressure bar apparatus and the process repeated until the bottom end is also sealed. The heater bar may take the form of a curve if it is desired to change the configuration of the bottom edge, or alternatively a series of straight lines may be utilized to form welds 58 and 60 which are overlapped or joined at 62 thereby, forming a continuous heat sealed or welded end.

The open end 64 is preferably coupled through the opening of ring member 66 and over the circumference of the ring until it comes into contact with the outer surface of the media thereby surrounding ring member 66. A plurality of stitches 68 is sewn in the fold over lip portion 70 of the media 30, in a conventional manner, thereby forming the filter bag assembly 10.

It is clearly understood that although only two straight lines forming the weld seam are shown at the edge 56 of media 30, any number of straight lines may be utilized to form a desired curve or alternatively, a curved resistance wire may be used to accomplish that end.

The ring member 66 of filter bag 10 is used to fold over the lip portion of a filter basket within a pressurized system as disclosed in the patent referenced earlier. Thus, the holes caused by sewing the ring member to the media 30 are never exposed to the fluid being filtered. Therefore, the integrity of the filter media is maintained and the desired filtering level is obtained.

In the preferred embodiments presently in use, the system utilizes an air pressure of ten pounds per square inch on the pressure bar to initiate the closing operation and the pressure is increased to ninety pounds per square inch during the time that the resistance wire is receiving current, raising its temperature. The current fed to the resistance wire reaches a preferred temperature of 450 degrees Fahrenheit (for polypropylene and up to 1000 degrees Fahrenheit for fiberglass or a fluorocarbon media) which causes the media to melt forming the welded beads or seams 54, 58 and 60. The temperature at which the media may be removed from the resistance bar varies depending upon the type of material used and has a range of between 200 and 250 degrees Fahrenheit. The current being applied to the resistance wire to generate the proper temperature varies between seven (7) seconds and twenty-five (25) seconds and is directly related to the diameter of the resistance wire which, in the preferred embodiment, utilized nickel chromium wire having a cross section of 0.072 circular mills. In order to insure release of the media 30 from the resistance wire 40 a momentary pulse of electricity is applied to raise the temperature of the resistance wire 40 a sufficient amount to release the media therefrom.

A typical filter manufactured according to the principles of the instant invention may be obtained from Universal Filters, Incorporated under the trademark OIL MAGNET. The media material selected for use in the filter bag can provide nominal micron ratings anywhere from 0.2 to 1600.

Hereinbefore has been disclosed a filter bag assembly and method of manufacture which may be used in high pressure filter systems. The filter bag's integrity is maintained since the fluid being filtered is not exposed to any needle holes used to fabricate the filter bag. It will be understood that various changes in the details, materials, arrangement of parts and operating conditions which have been herein described and illustrated in order to explain the nature of the invention may be made by those skilled in the art within the principles and scope of the present invention.

Having thus set forth the nature of the invention, what is claimed is:

1. A method for fabricating a filter bag comprising the steps of:
    (a) preparing filter media in an elongated, generally rectangular configuration;
    (b) folding said media in half along its longitudinal axis;
    (c) placing the juxtaposed edges of said media over a resistance wire disposed in a heater bar;
    (d) closing said pressure bar upon said heater bar with said media disposed therebetween with a prescribed amount of pressure;
    (e) applying electrical current to said resistance wire for a prescribed period of time;
    (f) opening said pressure bar after termination of said electrical current and a prescribed low temperature limit is reached;
    (g) removing said media from said heater bar;
    (h) inserting one distal end of said media between said pressure bar and said heater bar with a prescribed amount of pressure;
    (i) applying electrical current to said resistance wire for a prescribed period of time;
    (j) opening said pressure bar after termination of said electrical current and said prescribed low temperature limit is reached;
    (k) placing the open distal end of said media over a relatively rigid ring means; and
    (l) sewing said media so as to capture said ring means thereto forming a container.

2. A method according to claim 1, wherein said media is fabricated from synthetic fibers taken from the group of woven and non-woven polypropylenes, polyesters, fiberglasses, fluorocarbons and polyamides.

3. A method according to claim 1, wherein the prescribed amount of pressure is between 70 and 120 psi.

4. A method according to claim 1, wherein application of said electrical current causes said resistance wire to reach a peak temperature of between 400 and 1000 degrees F.

5. A method according to claim 1, wherein said low temperature is between 150 and 350 degrees F.

6. A method according to claim 1, wherein said electrical current is applied to said resistance wire from between 5 and 75 seconds.

7. A method according to claim 3, wherein said pressure is approximately 90 psi.

8. A method according to claim 4, wherein said peak temperature is approximately 450 degrees F.

9. A method according to claim 5, wherein said low temperature is approximately 250 degrees F.

10. A method according to claim 5, further including the step (m) of applying a momentary electric current to said resistance wire to release the media therefrom.

* * * * *